United States Patent [19]

De Roissart

[11] 3,772,153
[45] Nov. 13, 1973

[54] APPARATUS FOR THE PRESERVATION OF ANIMAL OR HUMAN ORGANS IN LIVING CONDITION

[75] Inventor: Henry De Roissart, Grenoble, France

[73] Assignee: L'Air Liquide, Societe Anonyme pour l'Etude et l'Exploitation des Procedes Georges Claude, Paris, France

[22] Filed: Feb. 25, 1971

[21] Appl. No.: 118,653

Related U.S. Application Data

[63] Continuation-in-part of Ser. No. 812,696, April 2, 1969, Pat. No. 3,607,646.

[52] U.S. Cl. ................................. 195/127, 195/1.7
[51] Int. Cl. ............................................. C12k 1/10
[58] Field of Search ........................... 195/1.7, 127; 62/308, 78; 23/258.5; 128/DIG. 3

[56] References Cited
UNITED STATES PATENTS
3,406,531  10/1968  Swenson et al. .................... 195/127

OTHER PUBLICATIONS

Eiseman et al., A Disposable Liner Perfusion Chamber, Surgery Vol. 60, No. 6, pp. 1183–1186.

Primary Examiner—A. Louis Monacell
Assistant Examiner—Robert J. Warden
Attorney—Lee C. Robinson, Jr.

[57] ABSTRACT

An apparatus for the preservation of living tissue such as an organ excised from the body for an extended time with a view toward future transplant thereof. The organ is placed in a refrigerated environment and under pressure while a nutrient fluid is circulated through its arterial complex. The gas utilized for pressurizing the environment of the organ is biochemically inert and serves as a carrier of oxygen which is absorbed by the nutrient, the latter being subjected to the influence of the pressurizing gas.

6 Claims, 2 Drawing Figures

APPARATUS FOR THE PRESERVATION OF ANIMAL OR HUMAN ORGANS IN LIVING CONDITION

CROSS-REFERENCE TO RELATED APPLICATION

This application is a continuation-in-part of co-pending U.S. application Ser. No. 812,696 filed Apr. 2, 1969, by Henry de Roissart, now U.S. Pat. No. 3,607,646.

BACKGROUND OF THE INVENTION

This invention pertains to the science of Biology and more particularly to apparatus for accomplishing certain endeavors in the field of preservation of living tissue.

It is a well-known fact that the preservation of live animal or human organs, such as the kidneys, heart, liver, etc., excised from the body with a view to transplant, is favourably assisted by a number of factors.

One of these is that the organ to be preserved must be maintained in an environment of low temperature, below 37°C., in order to lessen all metabolic activity. Another requirement is that the organ be supplied with a fluid containing basic nutrient elements as well as oxygen.

A third requirement is that of a pressurized or hyperbaric environment in which the organ is subjected to a pressure in the neighborhood of two to fifteen bars or more above that of the atmosphere. It has been established that oxygen under pressure favors preservation of the organ, particularly if it is combined with refrigeration and in-fusion of a nutrient.

However, the exclusive, or at least main, means employed to ensure a hyperbaric environment has been oxygen which is also used to oxygenate the nutrient infusion or perfusion liquid to a maximum. When this was not so, e.g., when using a gas composed of nitrogen and oxygen to oxygenate the nutrient perfusion liquid, care has always been taken to use dissolution pressures which were sufficiently high to ensure that the perfusion liquid would contain at least four volumes per cent of dissolved oxygen. This currently employed practice is the result of the generally accepted theory that the organ being preserved needs the maximum amount of this indispensable element. However, in spite of all the devices and precautions taken, the preservation life of an excised organ is still very limited, around ten to twenty hours maximum

SUMMARY

One object of the present invention is to provide a new and improved apparatus for the preservation of living tissue for a substantial period of time by the combination of low temperature, perfusion and hyperbaric environment, used according to a certain number of operating conditions.

Basically, it was assumed that failures might be caused by the toxic effect of excess oxygen in the tissues, such excess being inevitable when pure oxygen or a high percentage oxygen mixture was being used as the hyperbaric agent or for the oxygenation of the perfusion liquid. One of the features of certain embodiments of this invention is that the oxygen supply to the organ is set to the level required for the survival of the organ by means of a pressurized gas consisting essentially of a bio-chemically inert gas of high permeation factor and low oxygen content, at least under ten percent by volume, such a gas being dissolved in the perfusion liquid and, in some cases, being the means by which the environmental medium of the organ is placed under pressure. The appropriate quantities of oxygen must be determined for each individual organ, and care must be taken not to feed the organ with more than a limited supply of oxygen, in any case much less than the amount generally provided by known equipment. With this arrangement, the phenomena known as superoxygenation can be avoided.

In the disclosed embodiments of the invention, the oxygen can in fact reach the organ both via the environmental medium of the organ and via the perfusion liquid, although it appears that the latter means is easily the most important. The use of a low oxygen content, bio-chemically inert gas means that the required hyperbaric pressure can be maintained without involving an excess supply of oxygen to the living organ. Similarly, the oxygen concentration of the perfusion liquid is considerably reduced by using a carrier gas which is bio-chemically inert. By "bio-chemically inert" we mean a gas which has no adverse effect on the constituents of a living organ, while by "permeation" we mean the property which a gas has to permeate through a cellular tissue wall. This second characteristic appears to be of particular importance, since it will be realized that the inert gas will not only serve to dissolve the oxygen in the perfusion liquid but also as the vehicle carrying both the oxygen and the carbonic gas which is formed in the tissue cells during metabolism.

For reasons of simplification, the same gaseous mixture is employed for the limited oxygenation of the perfusion liquid and for the hyperbary of the environmental medium of the living organ. The choice of the inert gas on the mixture is in fact fairly limited, and helium is the outstanding one because of its excellent physiochemical qualities.

It has not yet been possible to determine the exact limits of a suitable oxygen content, but bearing in mind that the percentage of dissolved oxygen in the blood is about 0.3 millilitres for 100 millilitres of blood, consequently about a similar percentage of oxygen, between 0.1 and 0.2 millilitres of oxygen for 100 millilitres of liquid, is dissolved in the perfusion liquid at normal perfusion flow, i.e., oxygen percentages of about 1 to 5 percent in the bio-chemically inert gas. However, it is clear that this figure may be somewhat modified without basic alteration of the survival time of the living organ, all other things being equal and within certain limits. Superoxygenation effects may be expected once 10 percent of oxygen is reached, and other factors, such as hyperbaric pressure, refrigeration temperature, perfusion flow and the nature of the living organ, must be taken into account when deciding on the appropriate oxygen percentage.

A further object of the present invention is to provide novel apparatus for preventing gassy embolisms. To this end several advantageous embodiments of the invention include means for maintaining the oxygenation pressure of the perfusion liquid below the pressure of the environmental medium of the living organ. The quantity of gas dissolved in a liquid depends on the pressure of that gas and the temperature of the medium. Because the gas dissolved in the liquid contained in the oxygenating tank is a mixture of oxygen and an inert gas, the quantity of dissolved oxygen is always less than that which it would be at the saturation point.

Since the perfusion liquid and the environmental medium of the organ are at the same temperature, the higher pressure of the environmental medium provides a higher saturation point, and there is no risk of bubble formation which would give rise to gassy embolism.

Decompression is a particularly delicate operation because of the risk of bubbles forming which would cause gassy embolisms inside the organ, so it is carried out differentially over a period of time: firstly, decompression of the gas in the oxygenating tank to atmospheric pressure, and subsequently, after complete purging of the organ, decompression of the environmental medium of the organ. By this means, degassing is achieved which is indispensable to the perfusion liquid, and it may be noted that this operation is all the more rapid when helium is employed since this gas possesses a very high desolubilization rate. During decompression of the perfusion liquid, recourse may also be taken to heating and agitating this liquid in the oxygenation tank which has the effect not only of increasing desolubilization speed but also decreasing the final concentration of dissolved gas in the liquid.

The present invention, in several preferred embodiments, comprises apparatus for keeping alive an organ of human or animal origin, which includes a sealed vessel adapted to contain the organ, a sealed nutrient fluid container, a fluid transmission line attached to the organ and forming a closed circuit with the container, means for circulating the infused nutrient fluid, a source of gas under pressure, a first conduit for introducing gas from the source into the container, and a second conduit for introducing gas from the source into the vessel. The gas preferably is a mixture of an inert gas and oxygen.

Other objects, features and advantages will be apparent from the following description of cerain preferred embodiments of the invention, taken in connection with the accompanying drawings.

DETAILED DESCRIPTION

Figure 1:
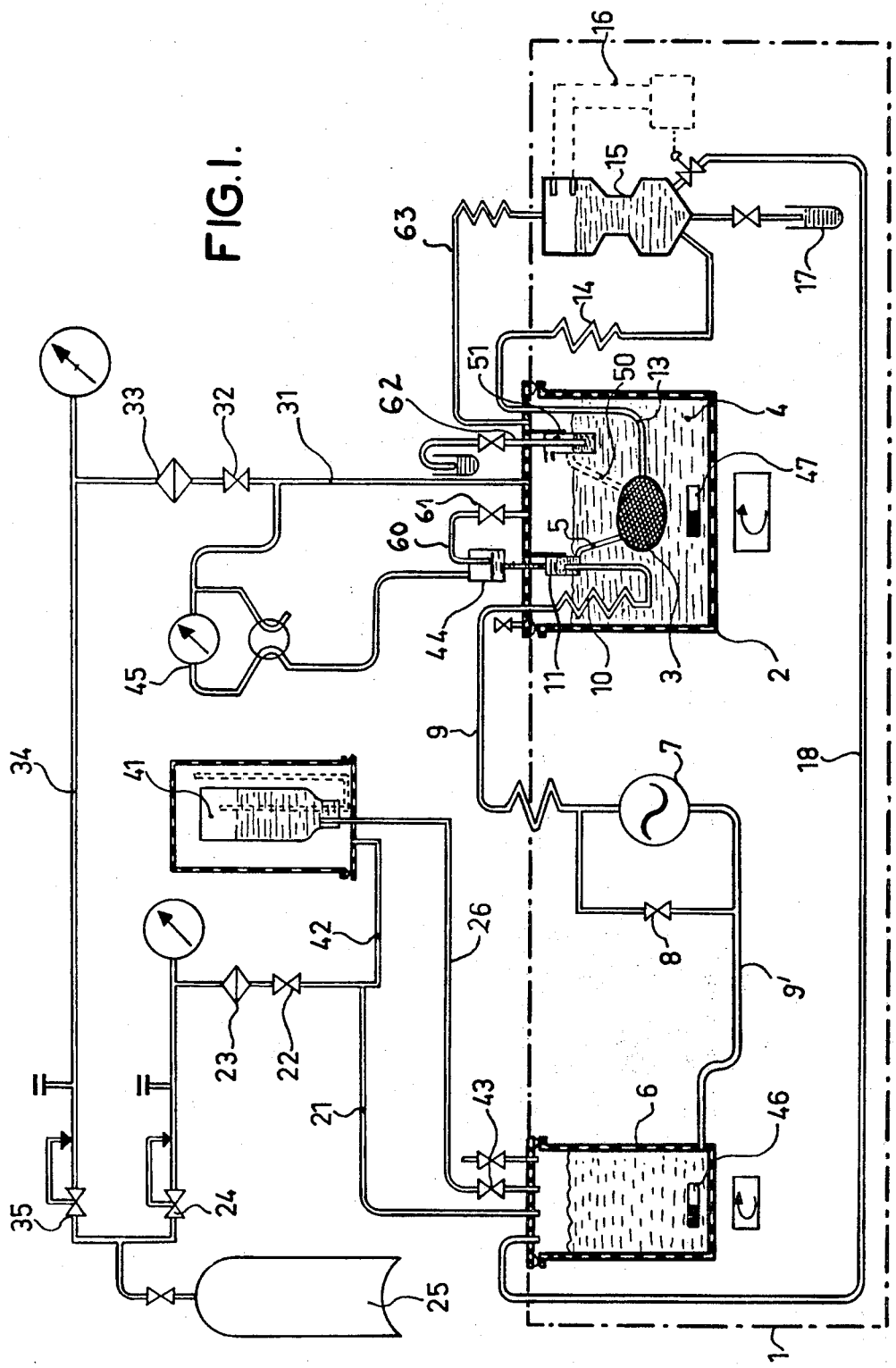
FIG. 1 is a schematic representation of an assembly of interconnected component elements in accordance with one illustrative embodiment of the invention.

Referring to FIG. 1, the dotted lines 1 indicate the confines of a thermostatically controlled refrigerated enclosure which may have various forms, well known in the art, and need not be described in detail. In this enclosure, there is included a vessel 2 in which the organ 3 to be kept alive is deposited. The organ 3 may be immersed in a sustaining solution 4 if necessary. The inlet to the organ's arterial or venal complex is connected to a conduit 5 which is supplied from an oxygenating, nutrient fluid container 6. This connection includes a pump 7 having a by-pass at 8, a flexible tube 9 and a conduit 9' which terminates near the bottom of the container 6. The tube 9 is connected, within the vessel 2, to a heat exchanger 10, and the outlet of the heat exchanger terminates within the lower chamber 11 of a buffer-damper.

The outflow from the organ 3 is received by a conduit 13 having a flexible portion 14 connected to the bottom of a constant level tank 15. The liquid level in the latter may be regulated by conventional means 16, shown in dotted outline, having level sensors located in the tank which control the valve in the return conduit. The regulation is for the purpose of maintaining substantially the same level of nutrient fluid within the tank 15 as that of the liquid in the vessel 2 in order to avoid excessive pressure downstream of the organ 3. The tank 15 has a drain 17, and the outlet from the tank is connected by a conduit 18 to the interior of the container 6.

In order to apply the required pressure on the nutrient liquid placed in the container 6, there is introduced through the sealed top thereof a conduit 21. This conduit leads to a valve 22, a biological filter 23 and the outlet of a pressure regulator valve 24. The valve 24 in turn connects to the outlet of a high pressure tank 25 filled with helium containing a small amount of oxygen.

In a similar manner, the interior of the vessel 2 is connected to the supply tank 25 by a conduit 31, a valve 32, a biological filter 33, a conduit 34 and a pressure regulator 35.

While the invention contemplates, by way of example, the use of helium as the inert gas within the tank 25, it is, of course, within the province of the apparatus herein outlined to use other gases or combinations thereof, either in one tank or in separate tanks for supplying the container 6 and the vessel 2.

For the replenishing of the nutrient fluid, a flask 41 is provided and is subjected to the same environmental pressure as the pressurized container 6. This is accomplished by a conduit 42 which joins the conduit 21 and the enclosure for the flask. The interior of the flask is connected with the interior of the container 6 by a conduit 26 and a regulating valve 43.

Most of the component elements are of conventional design and well known in the art and, therefore, no lengthy description thereof need be given. However, some are of unique design, such as the buffer-damper which will be described later in more detail. Suffice it to say that the lower chamber 11 of the buffer-damper works in connection with the upper sealed chamber 44. The purpose of this device is to eliminate the formation of gas bubbles in the supply conduit and also, by virtue of the gas in the chamber 44, to cushion the effect of the pulsations of the pump 7 on the liquid in-flow to the organ 3.

The pressure gauge shown at 45 has the purpose of indicating the difference in pressure between that in the vessel 2 and in the nutrient fluid just before penetrating the organ 3. The control of this pressure difference in effect controls the perfusion pressure of the nutrient liquid. It should be noted that suitable magnetically driven agitators are illustrated such as at 46 in the container 6 and 47 in the vessel 2.

Considering the operational features, the gas in the tank 25 may contain volumetrically 99 percent helium and 1 percent oxygen. The pressure regulator 35 is adjusted such that in the conduit 34, and therefore in the vessel 2, there is about 5–10 bars of pressure. The pressure regulator 24 is so adjusted that the pressure in the supply container 6 should be a few bars less than that in the vessel 2.

When the pressure difference is so established, the nutrient fluid in the container 6 saturates with gas due to the agitation of the liquid. The fluid is forced by the pump 7 — which, by the way, also serves as the dosage means — into the heat exchanger 10 and from there into the organ 3. Here it is separated into venal outflow and secretions such as urine in the case of a kidney. The venal outflow is collected in the constant level tank 15 and is re-cycled back into the oxygenating container 6. The secretions may be removed by a conduit 50 into a storage vessel 51 which may be drained by a conventional pipe 62.

Some of the component elements of note will now be described. The buffer-damper comprises two chambers 11 and 44. The lower chamber 11 communicates by a narrow or restricted passage with the upper sealed chamber 44. By virtue of this narrow passage, the nutrient flowing toward the organ 3 will not be saturated with gas due to the pressure prevailing in the upper chamber 44. The latter communicates by a conduit 60 and a stop valve 61 with the interior of the vessel 2. The level of liquid in the chamber 44 is normally at the terminal end of the conduit 60 in chamber 44. Consequently, it is the gas which fills the upper part of the chamber 44, and it is this compressed gas which acts as a buffer and smooths out the pulsations of the pump 7.

The container 51 with the drainage pipe 62 is preferably placed within the vessel 2, and its upper, open end communicates with the upper part thereof.

The interior of the constant level tank 15 is, of couse, maintained at the same environmental pressure, by means of an inlet through the conduit 63, with the vessel 2. It is, in fact, the constant level regulation which permits the re-cycling of the nutrient fluid through the conduit 18.

Figure 2:
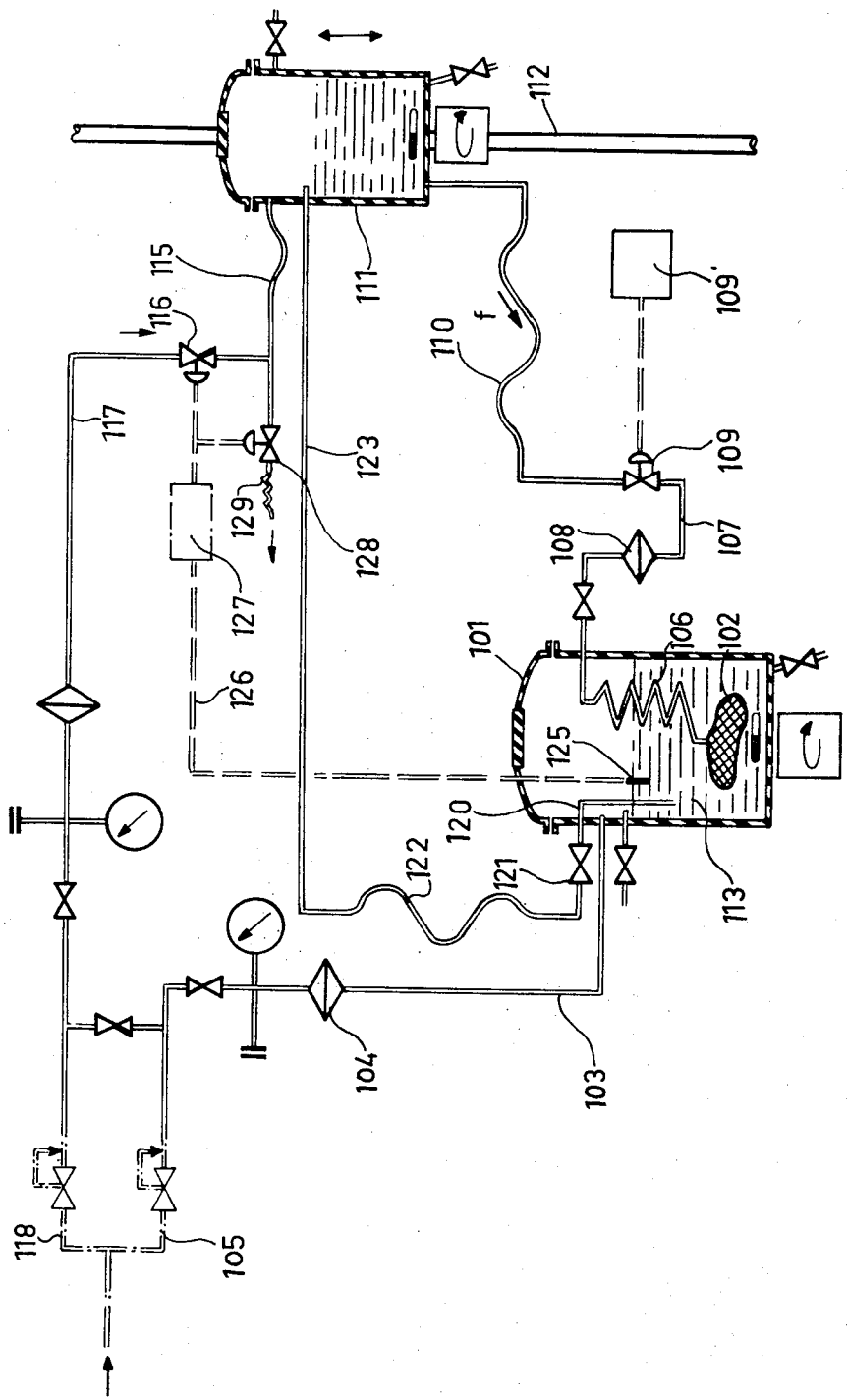
FIG. 2 is a schematic representation similar to FIG. 1 but showing an assembly of interconnected component elements in accordance with another illustrative embodiment of the invention.

In the embodiment of FIG. 1 the pump 7 serves to circulate the nutrient fluid through the arterial complex of the organ 3. In other more simplified versions of the invention the fluid is maintained under a well-defined static pressure to accomplish such circulation. Referring to Fig. 2 of the drawings, there is shown a vessel 101 which contains a living organ 102. The vessel 101 is maintained under gaseous hyperbaric pressure in a manner similar to that described heretofore by a conduit 103, a bacteriological filter 104, a suitable pressure regulator and a conduit 105 leading to the gaseous source.

The living organ 102 within the vessel 101 is immersed in a nutrient perfusion liquid 113. In addition, the liquid is supplied to the organ through a conduit system including a heat exchanger 106, a bacteriological filter 108, a tube 107, a valve 109 and a flexible conduit 110. The liquid is discharged from the organ through an evacuation vein (not shown).

The conduit 110 is connected to a nutrient fluid container 111 which is supported in a vertically adjustable position on an upstanding column 112. This container is itself placed under hyperbaric gaseous pressure by a conduit system including a tube 115, a valve 116 and tubes 117 and 118 leading to the gaseous source.

The perfusion liquid circulates in a closed circuit. To this end, the liquid is discharged from the vessel 101 through a conduit 120, a valve 121, a flexible tube 122 and a conduit 123 leading to the container 111.

A sensing probe 125 is located within the vessel 101 at the desired liquid level. The probe 125 is connected, as shown schematically at 126, to a control device 127. The device 127 is effective to close the valve 116 and open a discharge valve 128 when the liquid exceeds the preset level. The valve 128 is interposed between the conduit 115 and a calibrated vent opening 129. As in the case of the embodiment of FIG. 1, the system is disposed within a suitable refrigerated enclosure (not shown in FIG. 2).

In operation, the vessels 101 and 111 are placed under hyperbaric pressure. Initially, the pressures in the two vessels desirably are equal to one another. The position of the vessel 111 on the upstanding column 112 is then raised to produce a difference in the level of the liquid in the two vessels and hence a pressure differential corresponding to the desired circulation pressure on the liquid. With the valve 109 in its open position, the circulation of the perfusion liquid is initiated in the direction of the arrow $f$ into the organ 102. The liquid is discharged from the organ into the vessel 101 in a manner automatically regulated by the characteristics of the organ's exhaust structures.

As the perfusion liquid flows into the vessel 101, the level within the vessel tends to increase. When the liquid level reaches the probe 125, the control device 127 automatically closes the valve 116 and opens the valve 128. This enables a slight gaseous discharge from the valve 128 with a corresponding reduction in pressure within the container 111. The decrease in pressure is such that the pressure within the container 111 becomes sufficiently less than the pressure within the vessel 101 to enable the return flow of liquid from the vessel along the conduits 120 and 123 to the container. During this return flow, the valve 109 is closed by a suitable cycling device 109' to avoid the possibility of any liquid discharge into the conduit 110. When the device 127 reopens the valve 116 and closes the valve 128, and with the valve 109' in its open position, liquid again flows from the container to the organ.

It will be apparent that each of the illustrated embodiments of the invention add in large measure to the survival time of the organ. When decompression is to be considered, which as a rule is a delicate operation in that it may easily cause the formation of gas bubbles, the following steps are recommended in the practice of the invention. Decompression is to be effected in stages. First the pressure in the oxygenating container 6 or 111 is reduced until it about reaches atmospheric conditions. After that and first by complete purging of the organ, the environment within the organ containing vessel is decompressed. This manner of procedure permits complete de-gassing of the nutrient fluid. It is to be noted that this is particularly easy when helium is used, which has a rapid desolubilization rate. This may be further aided by applying heat and agitation to the fluid in the oxygenating container.

The terms and expressions which have been employed are used as terms of description and not of limitation, and there is no intention in the use of such terms and expressions of excluding any equivalents of the features shown or described of portions thereof, it being recognized that various modifications are possible within the scope of the invention claimed.

I claim:

1. Apparatus for keeping alive an organ of human or animal origin comprising, in combination, a sealed vessel adapted to contain said organ, a sealed nutrient fluid container, means for refrigerating the vessel and the container, fluid transmitting means attached to said organ and forming a closed circuit with said container, the transmitting means including a pump for circulating the nutrient fluid through said closed circuit and a buffer-damper for minimizing the pulsating effect of the pump on the organ, said buffer-damper comprising two super-imposed chambers inter-connected by a narrow passage, a source of gas under pressure, said gas comprising a mixture of inert gas and oxygen, first conduit means for introducing gas from said source into said container, and second conduit means for introducing gas from said source into said vessel.

2. Apparatus in accordance with claim 1, wherein one of said chambers is closed, a bypass means for interconnecting the closed chamber with said vessel, and an auxiliary conduit interconnecting said closed chamber with the second conduit means, said auxiliary conduit including means for indicating the pressure difference between said auxiliary conduit and said second conduit means.

3. Apparatus for keeping alive an organ of human or animal origin comprising, in combination, a sealed vessel adapted to contain said organ, a sealed nutrient fluid container, means for refrigerating the vessel and the container, a replenishing tank located above the nutrient fluid container, said replenishing tank having an outlet leading to said container, fluid transmitting means attached to said organ and forming a closed circuit with said container, means for circulating the nutrient fluid through said closed circuit, a source of gas under pressure, said gas comprising a mixture of inert gas and oxygen, first conduit means for introducing gas from said source into said container, and second conduit means for introducing gas from said source into said vessel.

4. Apparatus for preserving an organ comprising, in combination, a sealed vessel adapted to contain said organ, a sealed nutrient fluid container, means for refrigerating the vessel and the container, fluid transmitting means interconnecting said container and the organ within said vessel for supplying nutrient fluid to said organ and for returning the nutrient fluid to the container, a supply of gaseous fluid under pressure, said gaseous fluid including a biochemically inert gas and oxygen mixed therewith, the amount of oxygen mixed with said gas being under ten percent by volume, first conduit means interconnecting said supply and said container for introducing gaseous fluid from said supply into said container, the gaseous fluid dissolving in said nutrient fluid within said container, second conduit means interconnecting said supply and said vessel for introducing gaseous fluid from said supply into said vessel, means for maintaining the pressure within said vessel in excess of the pressure in said container, and means for directing the nutrient fluid in said container through said transmitting means to said organ.

5. Apparatus for preserving an organ comprising, in combination, a sealed vessel adapted to contain said organ, said vessel having liquid level sensing means therein, a sealed nutrient fluid container, means for refrigerating the vessel and the container, fluid transmitting means interconnecting said container and the organ within said vessel for supplying nutrient fluid to said organ and for returning the nutrient fluid to the container, a supply of gaseous fluid under pressure, said gaseous fluid including a biochemically inert gas and oxygen mixed therewith, the amount of oxygen mixed with said gas being under ten percent by volume, first conduit means interconnecting said supply and said container for introducing gaseous fluid from said supply into said container, the gaseous fluid dissolving in said nutrient fluid within said container, second conduit means interconnecting said supply and said vessel for introducing gaseous fluid from said supply into said vessel, means for directing the nutrient fluid in said container through said transmitting means to said organ, and means controlled by said level sensing means and responsive to a predetermined increase in the liquid within said vessel for interrupting the flow of gaseous fluid into said container.

6. Apparatus in accordance with claim 5, in which the fluid transmitting means includes means for initiating the flow of nutrient fluid from said container to said organ.

* * * * *